United States Patent [19]

Penny

[11] Patent Number: 5,285,594

[45] Date of Patent: Feb. 15, 1994

[54] WEED GUARD COVER SYSTEM

[76] Inventor: Charles Penny, 108 Indian Hill Dr., Belleville, Ill. 62223

[21] Appl. No.: 887,891

[22] Filed: May 26, 1992

[51] Int. Cl.$^5$ ............................................. A01G 7/00
[52] U.S. Cl. .................................... 47/9; 47/33; 52/102; 256/32
[58] Field of Search ............... 47/9, 25, 33; 52/102; 256/32

[56] References Cited

U.S. PATENT DOCUMENTS

| | | | |
|---|---|---|---|
| 2,858,736 | 11/1958 | Hendrix | 47/25 |
| 3,059,378 | 10/1962 | Noras | 47/25 |
| 3,515,373 | 6/1970 | Abbe | 47/33 |
| 3,806,096 | 4/1974 | Eccleston | 47/33 |
| 4,044,501 | 8/1977 | Frydryk | 47/26 |
| 4,050,972 | 9/1977 | Cardinal, Jr. | 156/71 |
| 4,798,023 | 1/1989 | Morssinkhof | 47/26 |

FOREIGN PATENT DOCUMENTS

| | | | |
|---|---|---|---|
| 676906 | 3/1991 | Switzerland | 47/25 |
| 1598076 | 9/1981 | United Kingdom | 47/25 |

*Primary Examiner*—Henry E. Raduazo
*Attorney, Agent, or Firm*—Don W. Weber

[57] ABSTRACT

A flat weed guard cover system is presented which has at least two pieces. Each separate cover has a cut-out section and one or more flaps near the cut-out section. In use, a first weed guard cover is placed around a vertical structure with the structure protruding through the cut-out section and the flaps surrounding the vertical structure. A second cover section is then placed over the first with the vertical structure again protruding through the cut-out section of the second cover and the flaps of the second cover on top of the flaps of the first cover. The flaps may be sealed together by Epoxy glue or any other suitable manner. The edges of the cover may be secured to the ground by means of landscape staples. Different geometric shapes and different positions for the cut-out are also presented. The covers inhibit growth of weeds or other plant material around the vertical structure.

4 Claims, 3 Drawing Sheets

WEED GUARD COVER SYSTEM

BACKGROUND OF THE INVENTION

This invention relates to the field of landscaping and lawn care. More particularly it involves a cover to be placed around posts, trees, or any other vertical structures normally found outdoors so as to inhibit the growth of vegetation around the vertical structure. The main purpose of this device is to facilitate lawn care and landscaping and to cover the area immediately around a vertical obstruction so that vegetation does not grow in that area.

In the landscaping or lawn mowing field cutting or trimming around posts or other vertical structures with machinery has been a long-standing problem. Oftentimes, resort is had to hand-held devices which are laborious and time consuming and hence expensive.

This particular device is easily placed around a vertical obstruction. The device may be used in parks, along the highway where guardrails are in place, or around any outdoor structure for the purpose of inhibiting the growth of vegetation.

One purpose of this invention is to make lawn care and landscaping easier and less costly with respect to trimming around vertical obstructions. Another object of this invention is to improve the speed and ease with which outdoor areas may be kept neat and free from weeds or other vegetation. Further and other objects of this invention will become apparent upon reading the attached Specification.

BRIEF DESCRIPTION OF THE INVENTION

This invention comprises essentially a plurality of thin flat covers which are designed so that a series of covers may be easily placed about a guardrail post, fence post, tree or other vertical structure. The covers come in at least two separate pieces with each piece having a cut-out section for receiving the vertical structure. The adjacent and corresponding edges of each cover section also have flaps which may overlap.

In order to place the device around a vertical structure one simply places a first cover around the vertical structure with the structure protruding through the cut-out section. The side flaps of the cover are then placed on each side of the vertical structure. The second identical section is then placed around the vertical structure with the corresponding flaps of the second section placed over and secured to the corresponding flaps of the first section.

The edges of the weed guard cover may be attached to the ground by landscaping staples. With the entire device thus secured about the vertical structure, vegetation receives no sunlight, moisture or other nourishment and is not able to grow. Placing these devices around vertical structures eliminates the need for mowing or handtrimming.

DETAILED DESCRIPTION OF THE PREFERRED EMBODIMENT

Figure 1:
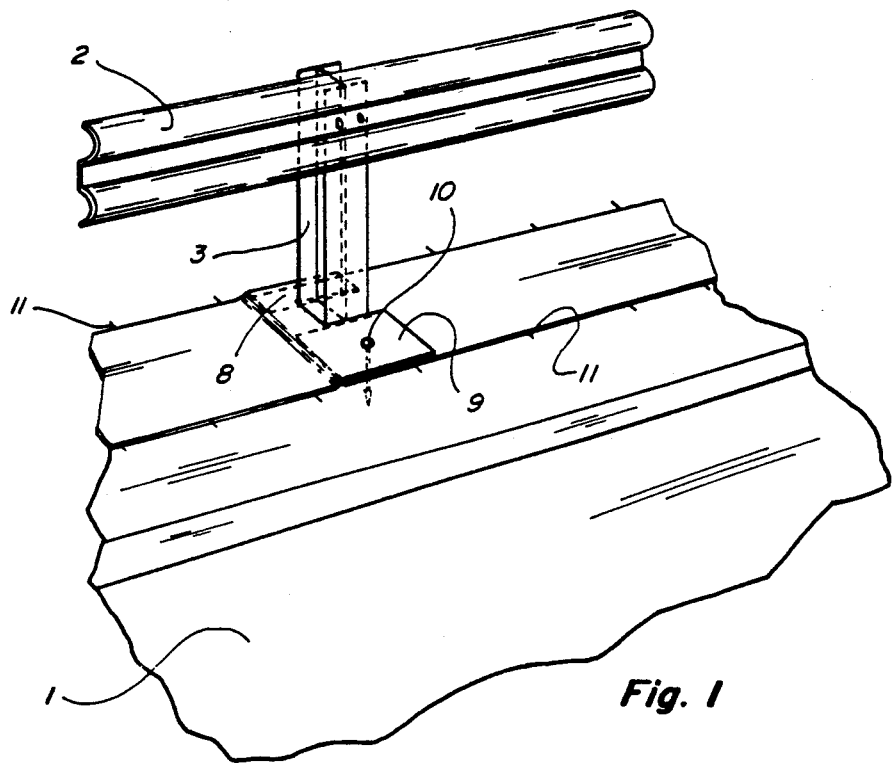
FIG. 1 is a partial perspective view of the device shown in place around a common highway guardrail.

It is often difficult for the highway department to cut or trim around the individual guardrails along a roadway system. Such a guardrail system is shown in FIG. 1. The roadway 1 has an area off to one side in which the horizontal guardrail 2 is placed. The horizontal guardrail is supported by vertical guardrail posts 3. In this embodiment of the device a plurality of flat weed guard covers 4 are secured between the guardrails as shown in FIG. 4 and described hereafter.

These guardrail covers 4 are designed to reduce vegetation around the guardrail. The use of the instant covers also eliminates the need for chemicals or other toxic means for inhibiting the growth of vegetation.

Figure 2:
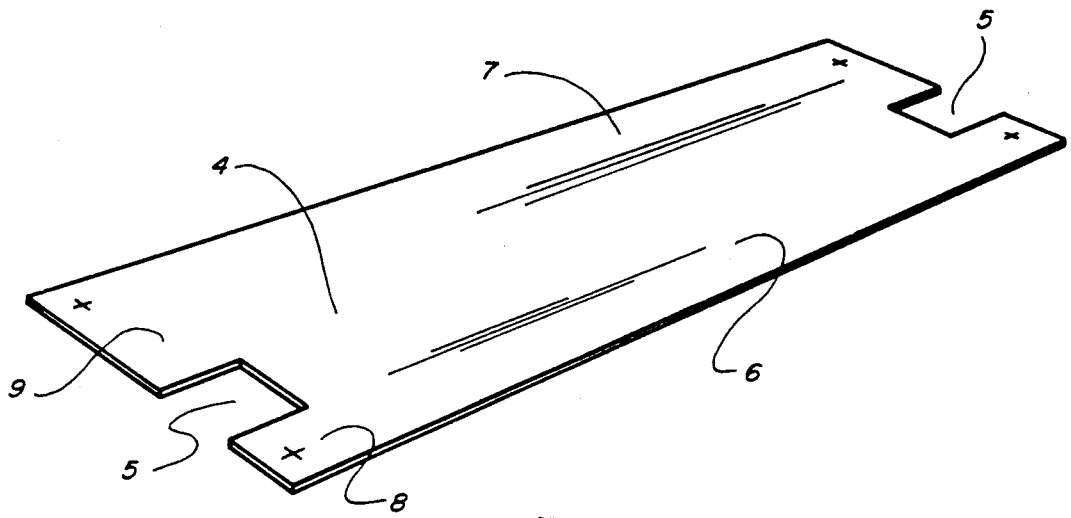
FIG. 2 is a perspective view of the device used for covering the areas between a common highway guardrail.
Figure 4:
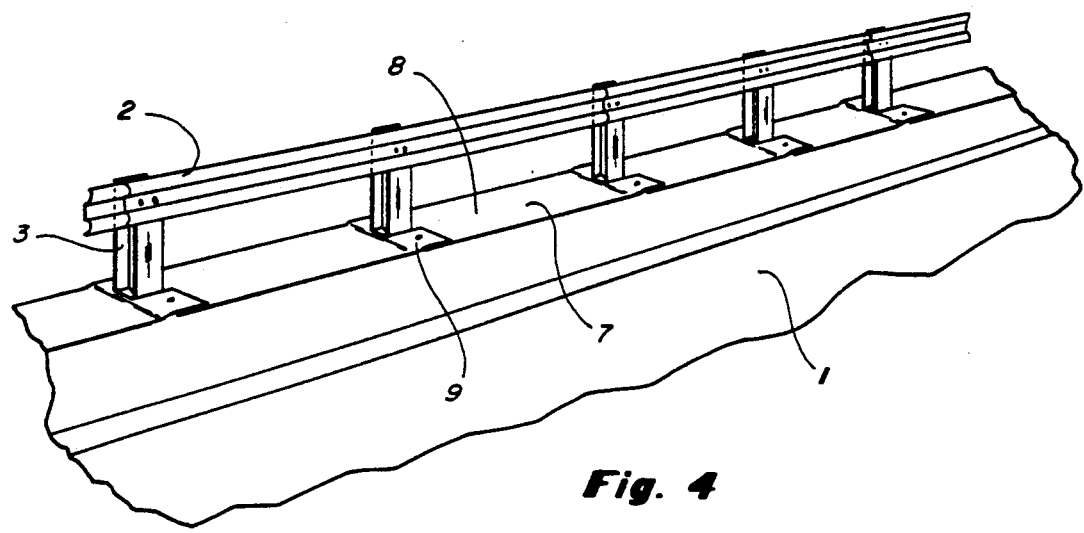
FIG. 4 is a perspective view of a plurality of the covers shown in place along a highway guardrail.

In the embodiment used for the guardrail post system as shown in FIGS. 1 through 4, the flat weed guard cover 4 has a rear section 6 and a front section 7. The rear section 6 is narrower than the front section 7. Since the cut-out portion 5 is offset as shown in FIG. 2 the front section 7 extends further toward the roadway as shown in FIGS. 1 and 4.

When the cut-out portion 5 is removed from the rectangular cover 4, rear 8 and front 9 overlapping flaps are created thereby. These flaps are created at both ends of the essentially rectangular cover as best shown on FIG. 2. When a plurality of identical covers are placed end to end as shown in FIGS. 1, 3 and 4, the front and rear corresponding end flaps overlap.

Figure 3:
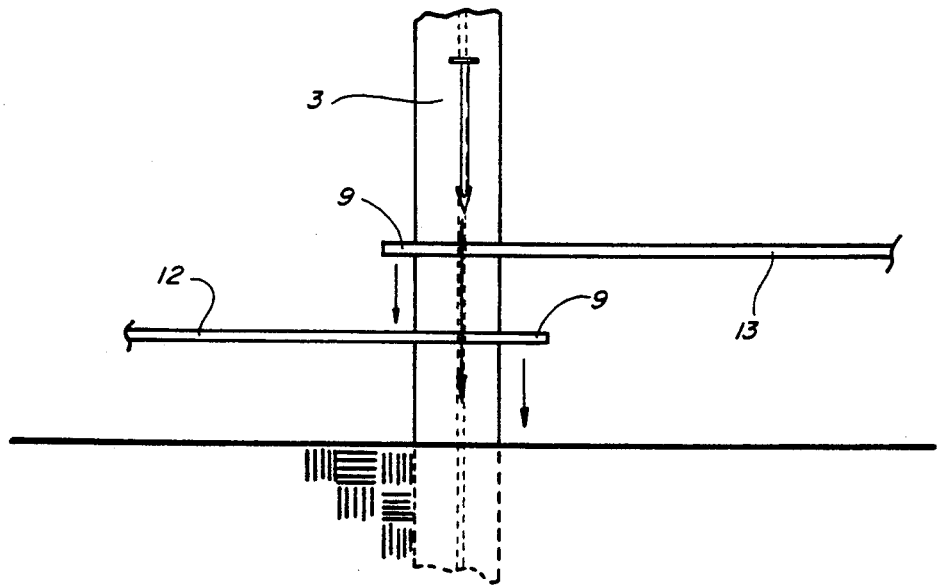
FIG. 3 is a front exploded view of the device showing how the first and second sections are placed around a guardrail.

In order to install the weed cover system, a first cover 12 is first placed on the ground with the guardrail post 3 in the cut-out 5 and surrounded by the front and rear end flaps as best shown in FIGS. 1, 3 and 4. A second cover 13 is then placed over the first cover 12 as shown in FIG. 3. The front 9 and rear 8 overlapping end flaps are then placed one on top of the other. The second cover end flaps are places over the corresponding first cover end flaps. The flaps are secured to each other by means of gluing, or by means of a spike 10 which fastens the front and rear flaps together. The entire section 4 may also be fastened to the ground by means of landscape staples 11.

The device may come in various colors, including black, green or gray depending on the aesthetic considerations involved.

Figure 5:
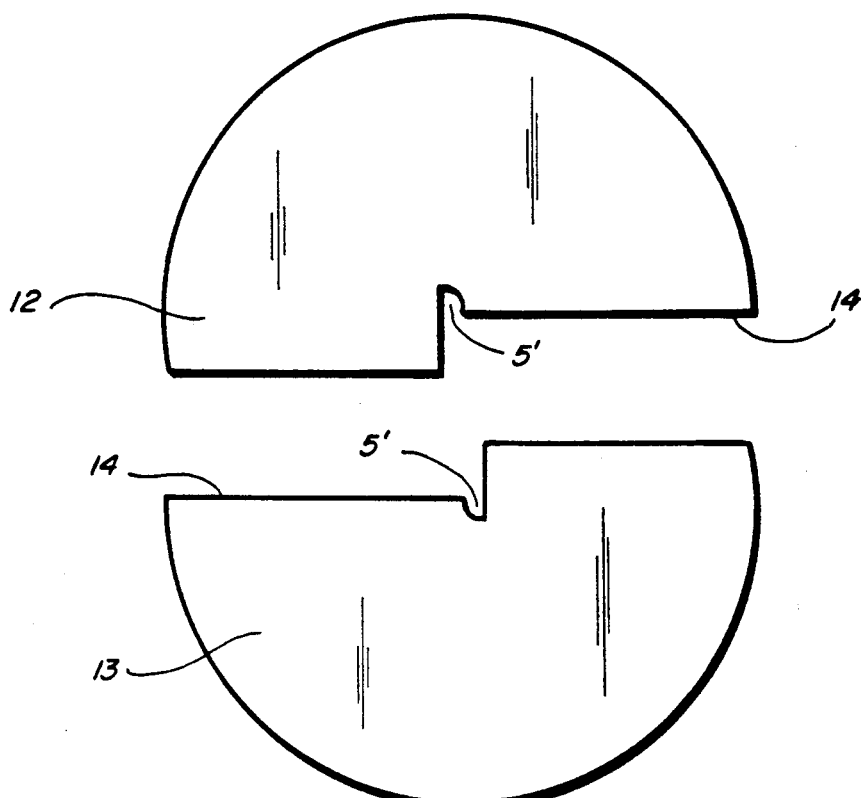
FIG. 5 is a top exploded view of an alternative semi-circular embodiment of the device for use around trees and shrubs.
Figure 6:
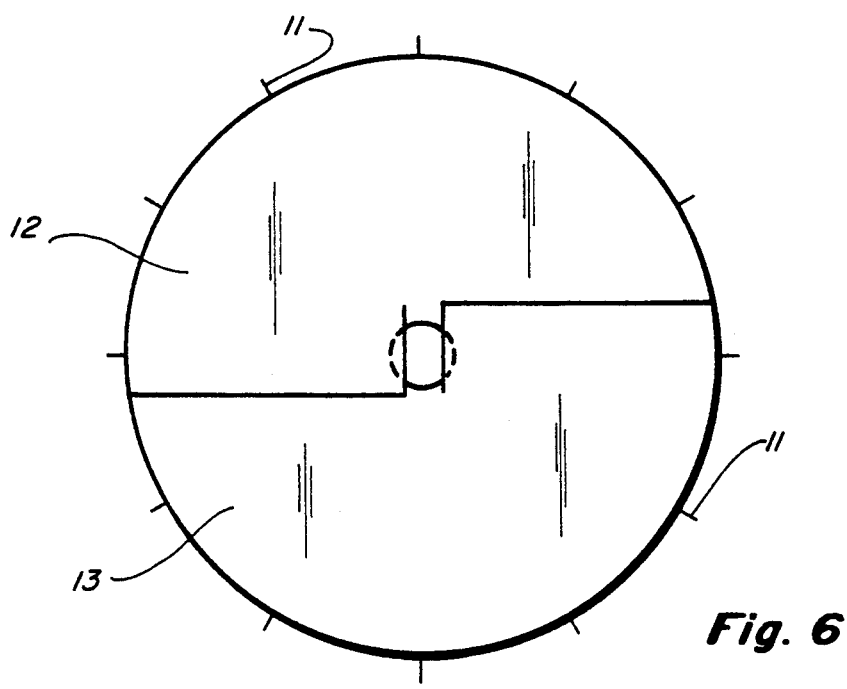
FIG. 6 is a top view of the device which is placed around trees or shrubs.

A variation of this essential idea is shown in FIGS. 5 and 6. In FIG. 5, two semi-circular covers are arranged so that a central cut-out 5' is cut out near the flat diameter edge 14 of each semi-circular cover. The corresponding semi-circular flat covers 12 and 13 also each have a corresponding overlapping flap 9'.

In use, the first cover 13 is placed around the tree, shrub or pole or other vertical structure with the vertical structure protruding up through the cut-out 5'. The second semi-circular cover 13 is then placed around the vertical structure with the structure protruding through the cut-out section 5'. The first vertical flap 8' is placed over the diameter edge 14 of the second semi-circular cover 13 and the overlapping flap 8' of the second cover 13 is placed over the diameter edge 14 of the first cover, as best shown on FIG. 6. The overlapping flaps are secured as in the guardrail embodiment previously described. The perimeter of the now circular fastened cover may be attached to the ground by means of landscaping staples 11. The two semi-circular first and second covers may be utilized for varying uses.

The guard rail cover is usually quite thin, with the preferred embodiment being approximately 1/16 of an inch thick. Since the guardrail cover may be manufactured by 50% reclaimable used rubber and 50% new rubber it is a great benefit to the environment. The covers designed for use around highway guardrails are normally approximately 7 feet by 2 feet strips with an offset cut-out 5 as shown on FIG. 2.

It may be readily understood that the weed guard system concept embodies covers of many different and irregular shapes as well as a slight variation in the placement and number of overlapping flaps and the placement of the cut-out section. Slight variations in design or geometric configuration are well within the contemplation of this invention.

Having fully described my invention, I claim:

1. A weed guard cover system for retarding the growth of vegetation around a series of vertical posts, comprising:

a plurality of adjacent, identical, essentially flat, flexible, essentially elongated rectangular covers;
   each cover having a front, a rear and two ends;
   each end having a rectangular, off-set, cut-out section;
   wherein said off-set, cut-out sections create a narrow rear section and a narrow rear flap and a wider front section and front flap;
   said cut-out sections adapted to receive a series of vertical posts, wherein said flaps are adapted to overlap the corresponding flaps of adjacent covers and wherein said corresponding overlapping flaps are secured together;
   further comprising a plurality of landscape staples placed along the front and rear edges of said cover whereby said cover is secured to the ground underneath said posts.

2. A weed guard cover system as in claim 1, wherein said cover is manufactured of 50% reclaimable rubber and 50% new rubber.

3. A weed guard system as in claim 2, wherein said cover is approximately 1/16th of an inch thick.

4. A weed guard system as in claim 1, wherein said cover is approximately 7 feet long and 2 feet wide.

* * * * *